United States Patent
Boley et al.

(10) Patent No.: US 10,521,439 B2
(45) Date of Patent: Dec. 31, 2019

(54) METHOD, APPARATUS, AND COMPUTER PROGRAM FOR DATA MINING

(71) Applicant: Fraunhofer-Gesellschaft zur Förderung der angewandten Forschung e.V., München (DE)

(72) Inventors: Mario Boley, Bonn (DE); Stefan Wrobel, Bonn (DE)

(73) Assignee: FRAUNHOFER-GESELLSCHAFT ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 1021 days.

(21) Appl. No.: 14/245,818

(22) Filed: Apr. 4, 2014

(65) Prior Publication Data

US 2015/0286686 A1   Oct. 8, 2015

(51) Int. Cl.
*G06F 16/2458*   (2019.01)

(52) U.S. Cl.
CPC ................ *G06F 16/2465* (2019.01)

(58) Field of Classification Search
CPC .................................. G06F 16/2465
See application file for complete search history.

(56) References Cited

U.S. PATENT DOCUMENTS

| 7,000,141 B1* | 2/2006 | Karlsson | G06F 9/5011 709/201 |
| 8,060,513 B2* | 11/2011 | Basco | G06F 17/3071 707/739 |
| 8,311,885 B2* | 11/2012 | Kennedy | G06Q 30/02 705/14.41 |
| 8,370,277 B2* | 2/2013 | Goto | G06F 17/30766 706/12 |
| 9,047,496 B1* | 6/2015 | Widdowson | G06K 9/00 |
| 9,105,135 B2* | 8/2015 | Bao | G06T 11/60 |
| 9,317,567 B1* | 4/2016 | Lu | G06N 5/022 |
| 9,529,915 B2* | 12/2016 | Lymberopoulos | G06F 16/9535 |
| 9,836,539 B2* | 12/2017 | Chiang | G06F 16/951 |
| 2002/0138492 A1* | 9/2002 | Kil | G06K 9/6253 |
| 2004/0143453 A1* | 7/2004 | Weaver | G06Q 30/02 705/2 |
| 2012/0059683 A1* | 3/2012 | Opalach | G06Q 10/06 705/7.27 |
| 2013/0086082 A1* | 4/2013 | Park | G06F 16/9535 707/748 |
| 2014/0250182 A1* | 9/2014 | Klemm | H04W 4/21 709/204 |

(Continued)

OTHER PUBLICATIONS

Jerry Pournelle, "1001 Computer Words You Need to Know", 2004, Oxford University Press.*

(Continued)

*Primary Examiner* — Jeff A Burke
*Assistant Examiner* — Huen Wong
(74) *Attorney, Agent, or Firm* — Bacon & Thomas, PLLC

(57) ABSTRACT

One or more data mining processes may be executed based on control parameters to discover a plurality of result patterns in a data set. The discovered result patterns are presented to a user. Information on one or more selected result patterns, where the selection involves the user's subjective interest, is received. The control parameters are automatically updated based on the received information on the selected result patterns.

16 Claims, 6 Drawing Sheets

(56) References Cited

U.S. PATENT DOCUMENTS

2015/0186427 A1* 7/2015 Logothetis ........ G06F 17/30958
707/776
2015/0262069 A1* 9/2015 Gabriel ............... G06F 16/9535
706/48

OTHER PUBLICATIONS

Mierswa "Open Source Data Mining mit RapidMiner" Kunstliche Intelligenz, vol. 2 (2009).
Berthold et al., "KNIME: the Konstanz Information Miner" Jun. 5-7, 2006; pp. 58-61 (Available at http://centaur.reading.ac.uk/6139/).
Hand et al., "Pattern Detection and Discovery" ESF Exploratory Workshop, London, UK, Sep. 16-19, 2002 Proceedings.
Hall et al. "The WEKA Data Mining Software: An Update" SIGKDD Explorations, vol. 11, Issue 1, pp. 10-18.
Bole et al., "One Click Mining—Interactive Local Pattern Discovery through Implicit Preference and Performance Learning" IDEA at KDD, Chicago, IL (Slide Presentation).
Bole et al., "One Click Mining—Interactive Local Pattern Discovery through Implicit Preference and Performance Learning" IDEA, Aug. 11, 2013, Chicago, IL, pp. 28-36.

* cited by examiner

| CDU 2005=high<br>CDU 2009=high<br>Unemployment=low | Children Pop.=high<br>LEFT 2005=low<br>LEFT 2009=low | Construction Workf.=low<br>LEFT 2005=low<br>LEFT 2009=low | CDU 2005=low<br>CDU 2009=low<br>#cars=low | Unemployed Youth=high<br>Unemployment=high<br>Manufacturing Workf.=low<br>FDP 2009=low<br>CDU 2005=low |
|---|---|---|---|---|
| Frequency : 0.334951<br>Lift : 0.114256<br>Prod. Ind. Freqs. : 0.106439 | Frequency : 0.589806<br>Lift : 0.112524<br>Prod. Ind. Freqs. : 0.364758 | Frequency : 0.696602<br>Lift : 0.108131<br>Prod. Ind. Freqs. : 0.480340 | Frequency : 0.577670<br>Lift : 0.100716<br>Prod. Ind. Freqs. : 0.376238 | Frequency : 0.208738<br>Lift : 0.023905<br>Prod. Ind. Freqs. : 0.017498 |

Fig. 6

| Children Pop.=low<br>Mid-aged Pop.=high | Unemployment=high<br>Area Code=high | Unemployment=high<br>Area Code=low<br>Old Pop.=high | Area Code=high<br>Pop. Density=high | Old Pop.=low<br>Constr. workf.=low |
|---|---|---|---|---|
| Frequency : 0.080097<br>Dev of GREEN 2009: 0.3852<br>Pattern Mean : 16.200000<br>Global Mean : 9.566748 | Frequency : 0.177184<br>Dev of LEFT 2009: 0.162571<br>Pattern Mean : 28.884932<br>Global Mean : 12.604369 | Frequency : 0.004854<br>Dev of SPD 2009: 0.293244<br>Pattern Mean : 37.700000<br>Global Mean : 22.048544 | Frequency : 0.007282<br>Dev of GREEN 2009: 0.3719<br>Pattern Mean : 15.966667<br>Global Mean : 9.566748 | Frequency : 0.626214<br>Dev of GREEN 2009: 0.0937<br>Pattern Mean : 11.167054<br>Global Mean : 9.566748 |

Fig. 7

METHOD, APPARATUS, AND COMPUTER PROGRAM FOR DATA MINING

Embodiments of the present disclosure relate to methods and apparatuses for knowledge discovery in databases, commonly also known as data mining.

INTRODUCTION

This section introduces aspects that may be helpful in facilitating a better understanding of the embodiments of the present disclosure. Accordingly, the statements of this section are to be read in this light and are not to be understood as admissions about what is in the prior art or what is not in the prior art.

Data mining in known to refer to a computational process of discovering patterns in large data sets involving methods at the intersection of artificial intelligence, machine learning, statistics, and database systems. An overall goal of data mining is to extract information from a data set and transform it into an understandable structure for further use.

Productive pattern discovery from data is known to be an iterative process that ideally requires a tight interaction between a discovery system and a user who is an expert of the data domain. Conventional analysis suites rely on an explicit construction of a discovery workflow including selection of a discovery method along with its parameters, a corresponding mining algorithm, and post-processing of results. The resulting high number of alternative formalizations of a single analysis task poses a substantial burden on creating and iteratively refining these workflows—especially for users that lack deep technical understanding of data mining methods and ultimately it hinders the desired rapid interaction. Conventional approaches tried to alleviate this problem by assisting the user in constructing or selecting a workflow or by providing direct active user-involvement for individual parts of the workflow such as for the post-processing or even the mining itself. However, all these approaches still expose the user to the complexity of the discovery workflow and/or require technical knowledge about its components that goes way beyond the semantic knowledge about the data domain.

SUMMARY

Some simplifications may be made in the following summary, which is intended to highlight and introduce some aspects of the various exemplary embodiments, but such simplifications are not intended to limit the scope of embodiments. Detailed descriptions of a preferred exemplary embodiment adequate to allow those of ordinary skill in the art to make and use the inventive concepts will follow in later sections.

According to a first aspect of the present disclosure it is provided a method for data mining. The method includes executing one or more of a plurality of data mining processes, which may be referred as "algorithms", based on control parameters to discover a plurality of result patterns in a data set. The method further includes presenting the discovered result patterns to a user and receiving information on one or more of the result patterns selected by the user according to the user's subjective interest. The control parameters are automatically updated based on the selected result patterns.

In some embodiments, the method may be iterative and comprise a plurality of iterations. An iteration of the method may comprise the aforementioned acts. A subsequent iteration may comprise executing one or more of the plurality of data mining processes based on the updated control parameters to discover an updated plurality of updated result patterns, presenting the discovered updated result patterns to the user and receiving information on one or more of the updated result patterns selected by the user according to the user's subjective interest. Again, the control parameters are automatically updated based on the selected result patterns, etc.

In some embodiments, the control parameters may be updated or computed based on a model of subjective user interest, also referred to as pattern utility model, and/or based on a process selection probability distribution. Hence, the control parameters may also be referred to as model parameters in some embodiments.

In some embodiments, the model of subjective user interest may be chosen as a linear model of the form $u_t(p)= \langle w_t, \varphi(p) \rangle$, where $\varphi:P \rightarrow \mathbb{R}^d$ denotes a d-dimensional feature map from the space of possible patterns p, and $w_t \in \mathbb{R}^d$ denotes a model parameter approximation at time t. Of course, other (more complex) models may be used as well. Features that may be used may be interestingness measures from the literature, such as frequency, target deviation, and lift, for example, but also features indicating whether a pattern makes a statement about certain attributes. Because the user may be often more interested in some attributes than others, embodiments can then map those preferences.

In some embodiments, executing the plurality of data mining processes may include executing the plurality of data mining processes on a programmable hardware device either in parallel (contemporary) or serially (subsequently).

In some embodiments, presenting the discovered result patterns may include displaying the result patterns to the user via a graphical or audiovisual user interface, which may be interactive.

In some embodiments, receiving information on one or more of the selected result patterns may include receiving information on a selection of one or more result patterns considered relevant by the user and/or on a selection of one or more result patterns considered irrelevant by the user.

In some embodiments, prior to executing a data mining process, the data mining process may be randomly selected from the plurality of data mining processes based on a process (algorithm) selection probability distribution function. In one embodiment, the selection probability distribution function for a data mining iteration/and data mining algorithm i may be computed according to $$\pi_{I,i} = ((\gamma_I - 1)v_i)/V + \gamma_I/k,$$

wherein V is a normaliaztion factor, $v_i$ is a vector of performance potential weights for algorithm i, k denotes a total number of data mining algorithms, and $\gamma_I$ denotes a bandit mixture coefficient of a multi-armed bandit algorithm.

In some embodiments, the method further comprises, upon executing a data mining process, adding one or more discovered result patterns to a pattern cache memory, leading to a change of state of the pattern cache memory. In one embodiment, performance of the executed data mining process may be assessed based on the change of state of the pattern cache memory and a current pattern utility model. In one embodiment, a selection probability distribution may be updated based on the assessed performance and a next or subsequent data mining process from the plurality of data mining processes may be randomly selected for execution based on the updated process selection probability distribution.

In some embodiments, presenting the discovered result patterns may comprise proposing a ranking of candidate patterns based on a current state of a pattern cache memory that is operable to store one or more discovered result patterns. In one or more embodiments, the proposed ranking of candidate patterns may be computed based on the current pattern utility model. In one embodiment, the proposed ranking of candidate patterns may be computed based on a greedy algorithm process that maximizes a ranking utility function at each stage. A feedback ranking of patterns may be determined based on the user's actual subjective interest in one or more of the result patterns of the proposed ranking of candidate patterns. The feedback ranking may be determined based on candidate patterns that have been declared by the user as relevant and based on candidate patterns that have been declared by the user as irrelevant. Updating the pattern utility model may be based on a comparison of the feedback ranking with the proposed ranking of candidate patterns.

According to a further aspect of the present disclosure, it is provided an apparatus for data mining. The apparatus includes processing circuitry which may be configured to execute instructions, stored in memory circuitry for example, to execute one or more of a plurality of data mining processes based on control parameters to discover a plurality of result patterns in a data set. The apparatus may further include an interface module which may be configured to present the discovered result patterns to a user and to receive information on one or more of the result patterns selected by the user according to the user's subjective interest. The apparatus may also include updating processing circuitry configured to automatically update the control parameters based on the selection of result patterns.

Some embodiments comprise digital circuitry installed within the apparatus. Such a digital control circuitry, e.g., a Digital Signal Processor (DSP), a Field-Programmable Gate Array (FPGA), an Application-Specific Integrated Circuit (ASIC), or a general purpose processor may be coupled to memory circuitry and configured accordingly by hardware and/or software. Hence, according to yet a further aspect of the present disclosure, there is provided a computer readable medium operable to store and execute machine readable instructions to: execute one or more of a plurality of data mining processes based on control parameters to discover a plurality of result patterns in a data set, present the discovered result patterns to a user, receive information on one or more of the result patterns selected by the user according to the user's subjective interest, and automatically update the control parameters based the selected result patterns.

BRIEF DESCRIPTION OF THE FIGURES

Some exemplary embodiments of apparatuses and/or methods will be described in the following by way of example only, and with reference to the accompanying figures, in which

FIG. 6 illustrates five exemplary association patterns found in analysis phase 1 of proof of concept experiment; and FIG. 7 shows some exemplary subgroup patterns found in analysis phase 2 of proof of concept experiment.

DESCRIPTION OF EMBODIMENTS

Figure 1:
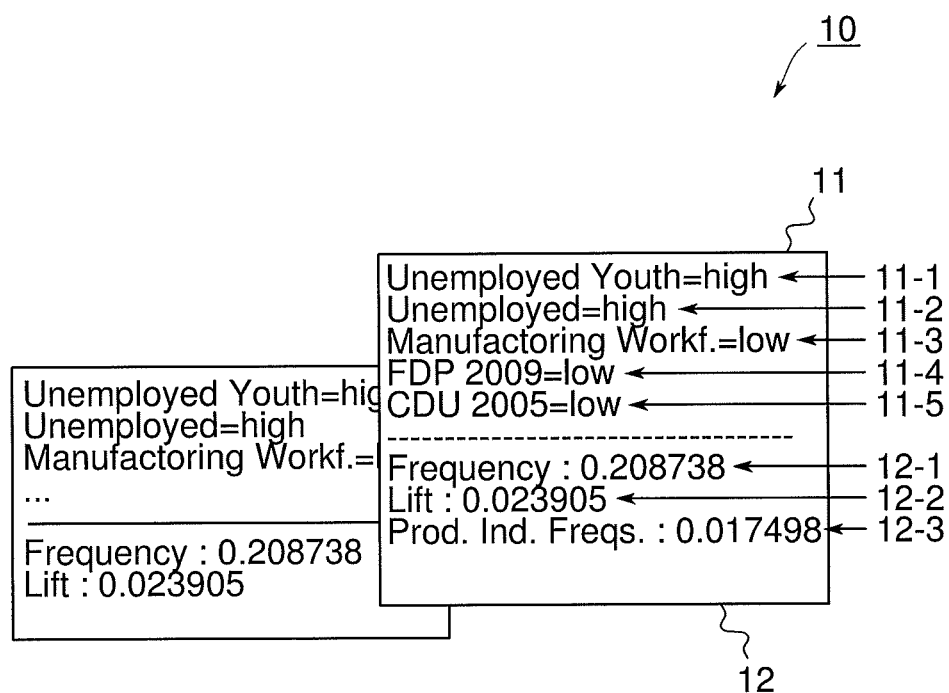
FIG. 1 illustrates an exemplary association pattern with a descriptor containing five attribute constraints and a rationale that contains two elementary interestingness functions and one function derived from them.

Various exemplary embodiments will now be described more fully with reference to the accompanying drawings in which some exemplary embodiments are illustrated.

Accordingly, while exemplary embodiments are capable of various modifications and alternative forms, embodiments thereof are shown by way of example in the drawings and will herein be described in detail. It should be understood, however, that there is no intent to limit the exemplary embodiments to the particular forms disclosed, but on the contrary, the exemplary embodiments may cover all modifications, equivalents, and alternatives. Like numbers refer to like elements throughout the description of the figures. It will be understood that, although the terms first, second, etc. may be used herein to describe various elements, these elements should not be limited by these terms. These terms are typically only used to distinguish one element from another. For example, a first element could be termed a second element, and, similarly, a second element could be termed a first element, without departing from the scope of exemplary embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or group thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which exemplary embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of exemplary embodiments and a corresponding detailed description are presented in terms of software, or algorithms and symbolic representations of operation of data bits within a computer memory. These descriptions and representations are the ones by which those of ordinary skill in the art effectively convey the substance of their work to others of ordinary skill in the art. An algorithm, as the term is used here, and as it is used generally, is conceived to be a process that includes a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular data types and may be implemented using existing hardware at existing network elements or control nodes. Such existing hardware may include one or more Central Processing Units (CPUs), Digital Signal Processors (DSPs), Application-Specific Integrated Circuits, Field Programmable Gate Arrays (FPGAs), computers, or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "storage unit", or "computer readable storage medium" may represent one or more devices for storing data, including Read Only Memory (ROM), Random Access Memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, exemplary embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors typically accesses stored instructions that are stored by the processor or on anther device/medium to perform necessary functions, processes and tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

In the present disclosure a new approach towards user involvement is presented that requires neither an explicit formalization of analysis goals in terms of a workflow or another specification language nor any technical data mining knowledge that goes beyond pure data semantics. Instead, embodiments rely on implicit feedback available from natural analysis behavior of a user when he investigates data and mining results. At the same time, embodiments allow the user to work with a multitude of pattern classes and mining algorithms simultaneously without even knowing the details of each algorithm. In particular, embodiments may avoid all method selection and parameter configuration acts from conventional processes. Instead a data mining act may be started, for example, by clicking a single dedicated "mine" button. Hence, this process may be referred to as "one-click mining". One goal of the embodiments is to produce patterns that are relevant to the latent user interest as fast as possible.

In the present disclosure it is described how this goal may be achieved by the interplay of two appropriately designed online learning/optimization components.

On the one side, there may be a model of the hidden user interest based on a suitably designed feature representation of the pattern types that are included in the range of the analysis system. In one embodiment, the learning of the corresponding model parameters may be based on a recently proposed co-active learning model, see for example Pannaga Shivaswamy and Thorsten Joachims, "Online structured prediction via coactive learning", in proceedings of the 29th International Conference on Machine Learning, (ICML 2012), 2012, or K. Raman, P. Shivaswamy, and T. Joachims, "Online learning to diversify from implicit feedback", in Proceedings of the 18th ACM SIGKDD international conference on knowledge discovery and data mining, pages 705-713, ACM, 2012.

On the other side, there may be a time-allocation strategy that may distribute a computational time-budget available in each pattern discovery act among a set of underlying data mining algorithms. In one embodiment, this task may be modeled as a multi-armed bandit exploration/exploitation problem where payoffs correspond to utility or interestingness of the discovered patterns. Since this utility/interestingness may be measured by an evolving approximation of the user interest, this problem may be addressed by a bandit algorithm suitable for shifting payoffs, see Nicolo Cesa-Bianchi and Gabor Lugosi, "Prediction, learning, and games", Cambridge University Press, 2006.

Overall, embodiments can aggregate any combination of data mining tasks, for which results can be mined by parameter-free anytime algorithms and be represented in a suitable joint feature space.

Before explaining details of exemplary embodiments of the proposed data mining concept, some general formal definitions for pattern discovery are provided and repeated starting from pattern classes (or languages), over scoring functions that assess pattern interestingness, up to mining algorithms that aim to find interesting patterns. As illustrative examples, we recall subgroup discovery and association discovery, which may also be used in some embodiments. As notational convention, throughout this disclosure we denote by [n] for a positive integer $n \in \mathbb{N}$ the set $\{1, \ldots, n\}$, and by $\mathbb{B}$ the set of truth values {true, false}.

Conventional approaches to local pattern discovery that are fully automated usually rely on a specific pattern (descriptor) language along with a single choice of a measure for assessing the utility or interestingness of a descriptor. In contrast, embodiments can aggregate a mixture of different pattern discovery methods and interestingness measures. Hence, we introduce an explicit notion of pattern that combines a descriptor with the information of why it is supposed to be interesting (i.e., with respect to what measure). We assume a given fixed dataset $D=\{d_1, \ldots, d_m\}$ of m data records $d \in D$, each of which may be described by a set of n attributes $A=\{a_1, \ldots, a_n\}$. All attributes $a_i$ assign to each data record a value from their attribute domain $V_i$, i.e., $a_i : D \rightarrow V_i$. For example, we assume that attributes are either numerical, i.e., $V_i \subseteq \mathbb{R}$ and we use $\leq$ to compare attribute values, or categorical, i.e., $|V_i|$ is finite and its values are incomparable. A pattern language $\mathcal{L}$ is a set of pattern descriptors $s \in \mathcal{L}$ to each of which we can associate a local extension $D(s) \subseteq D$ in the data.

For example, in "association discovery", where one aims to find attribute/value combinations that show a high co-occurrence in the data, one usually considers the language $\mathcal{L}_{cnj}$ of conjunctions of constraints on individual attribute values. That is, $\mathcal{L}_{cnj}$ contains descriptors s of the form $$s = c_{i_1}(\cdot) \wedge \ldots \wedge c_{i_s}(\cdot),$$

such that $c_{i_j} : V_{i_j} \rightarrow \mathbb{B}$ is a binary constraint on attribute $a_{i_j}$ for all $j \in [i_s]$. Correspondingly, the extension of s may be defined as $$D(s) = \{d \in D : c_{i_1}(a_{i_1}(d)) \wedge \ldots \wedge c_{i_k}(a_{i_k}(d))\}.$$

In particular, for a categorical attribute a, we may consider equality constraints $c(v)$ $v=b$ with $b \in V_i$, and for numerical attributes we may consider interval constraints $c(v)=v \in [l, u]$ with $l, u \in V_i$. We may refer to $cnst(s)=\{c_{i_1}, \ldots, c_{i_s}\}$ as the constraints and to $attr(s)=\{a_{i_1}, \ldots, a_{i_s}\}$ as the attributes contained in s, respectively. We assume that an attribute is contained at most once and call $|cnst(s)|=|attr(s)|=i_s \in \mathbb{N}$ the size of s.

A further example of a pattern language is provided by "subgroup discovery" where one is interested in pattern descriptors that are at the same time fairly general (e.g. have a large extension) and that show an unusual distribution of one specific target attribute $a_t \in A$ in their extension. The corresponding pattern language is $\mathcal{L}_{sgd} = \mathcal{L}_{cnj} \times [n]$, i.e., it contains descriptors $s=(c, t)$ with a conjunctive descriptor c annotated by the index t of a target attribute. The conjunction c also defines the extension of the subgroup descriptor s, i.e., $D(s)=D(c)$.

In order to assess how interesting a pattern descriptor is as an observation in the data, there is a wide range of interestingness functions $f: \mathcal{L} \rightarrow \mathbb{R}$ that have been developed across different pattern discovery methods, see for example Liqiang Geng and Howard J Hamilton, "Interestingness measures for data mining: A survey", ACM Computing Surveys (CSUR), 38(3):9, 2006. One example is the frequency $f_{frq}(s)$ of a pattern descriptor s, which may be defined as its generality measured as the fraction of data records that are part of the pattern's extension, i.e., $f_{frq}(s)=|D(s)|/|D|$.

Another example is the relative shortness of a pattern defined by $f_{sho}(s)=(n-|attr(s)|)/n$. Specifically for subgroup discovery interestingness, corresponding to its semantics, one may typically use composed functions of the form $$f_{sgd}^b(s,t) = f_{frq}(s)^b f_{dv}(s,t) \quad (1)$$

i.e., a multiplicative combination of frequency (weighted by a real-valued parameter $b \in [0, 1]$) and a target deviation function $f_{dv}$. For example, we may choose $f_{dv}$ to be the total variation distance between the distribution of the target attribute in the pattern extension $S=s(D)$ and the distribution in the complete data, i.e., $$f_{dv}(s, t) = \sup_{X \subseteq V_t} |p_S^t(X) - p_D^t(X)|.$$

Here, $p^t S$ and $p^t D$ are a (fitted) distribution of attribute values of $a_t$ in the pattern extension and the complete data, respectively. This function may provide a uniform interpretation of interestingness for categorical and numerical target variables.

Association interestingness may usually be quantified as the difference between the frequency of the pattern and its expected frequency if we assume that some of its parts are satisfied independently. Here, we may use a first order approximation to the leverage measure that can be computed efficiently, see Geoffrey I. Webb, "Self-sufficient item sets: An approach to screening potentially interesting associations between items", TKDD, 4(1), 2010. That is, we may consider the following additive lift measure defined by $$f_{lift}(s) = \left( f_{frq}(s) - \prod_{c \in cnst(s)} f_{frq}(c) \right) / 2^{|cnst(s)|-2}$$

Thus, conceptually this measure assumes as null hypothesis that all individual constraints of the descriptor are satisfied independently.

In summary, we can consider a pattern as a pair $(s, F) \in \mathcal{L} \times 2^{\mathcal{F}}$ where $s \in \mathcal{L}$ is a descriptor and $F \subseteq \mathcal{F}$ is a rationale comprising one or more interestingness measures with an appropriate domain. By the cartesian product $\mathcal{P} = \mathcal{L} \times 2^{\mathcal{F}}$ we denote the set of patterns defined by $\mathcal{L}$ and $\mathcal{F}$. As we will see below, it may be useful to potentially have more than one function in the interestingness rationale, because standard measures often are a function of several elementary functions—like in subgroup discovery interestingness, which is a function of frequency and target deviation. By providing feedback on a pattern annotated by elementary measures, a user may implicitly provide insight into his preferences about all other measures that can be computed from these elementary measures.

FIG. 1 shows an example of a pattern 10 that may be used in an exemplary embodiment. Exemplary association pattern 10 includes a descriptor 11 that contains five attribute constraints 11-1 to 11-5, for example, and a rationale 12 that contains two elementary interestingness functions 12-1, 12-2 and one function 12-3 derived from them, for example.

For an act of generation of patterns, let us denote by $\mathcal{M}$ a set of k mining algorithms that is at our disposal. For notational convenience we sometimes identify $\mathcal{M} = [k]$. From the perspective of embodiments an individual mining algorithm $m \in \mathcal{M}$ can simply be treated as producing a random set of result patterns $m(t) \subseteq \mathcal{P}$ with an unknown distribution that depends on the time $t \in \mathbb{R}$ that the algorithm is running. Of course, we usually know more about a given mining algorithm such as the pattern language it uses and the interestingness measure it optimizes. From the perspective of embodiments of the present disclosure it is not necessary to understand all of the details of these algorithms. Instead, it is sufficient to understand that these algorithms must satisfy the following two requirements.

First, we assume that the mining algorithms are parameter-free. In practice this can mean that a single algorithm either uses a specific parameter assignment of a mining algorithm or it is in fact a meta-algorithm that includes a parameter-selection procedure. Thereby a meta-algorithm may be understood as an algorithm to manipulate some other algorithm.

Moreover, the mining algorithms should be anytime algorithms, i.e., conceptually at every moment in time after they are started they maintain a current solution that can be retrieved when the algorithm is terminated preemptively. This may be preferable because in embodiments the time budget available for a given run of a mining algorithm may be determined by the user ad hoc.

These requirements can be (or are automatically) satisfied by a wide range of modern pattern discovery algorithms that provide various pattern types. Examples are "Slim" (see Koen Smets and Jilles Vreeken, "Slim: Directly mining descriptive patterns", in proceedings of the twelfth SIAM International Conference on Data Mining (SDM 2012), pages 236-247, 2012), pattern sampling (see for example M. Boley, S. Moens, and T. Gärtner, "Linear space direct pattern sampling using coupling from the past", in proceedings of the 18th ACM SIGKDD international conference on Knowledge discovery and data mining, pages 69-77, ACM, 2012), or beam search approaches (see for example Matthijs van Leeuwen and Arno J. Knobbe, "Non-redundant subgroup discovery in large and complex data. In Machine Learning and Knowledge Discovery in Databases", European Conference, ECML PKDD 2011, Athens, Greece, Sep. 5-9, 2011, Proceedings, Part III, pages 459-474, 2011).

We now describe exemplary embodiments of how different pattern discovery methods and algorithms may be combined within an inventive "one-click mining system".

Figure 2:
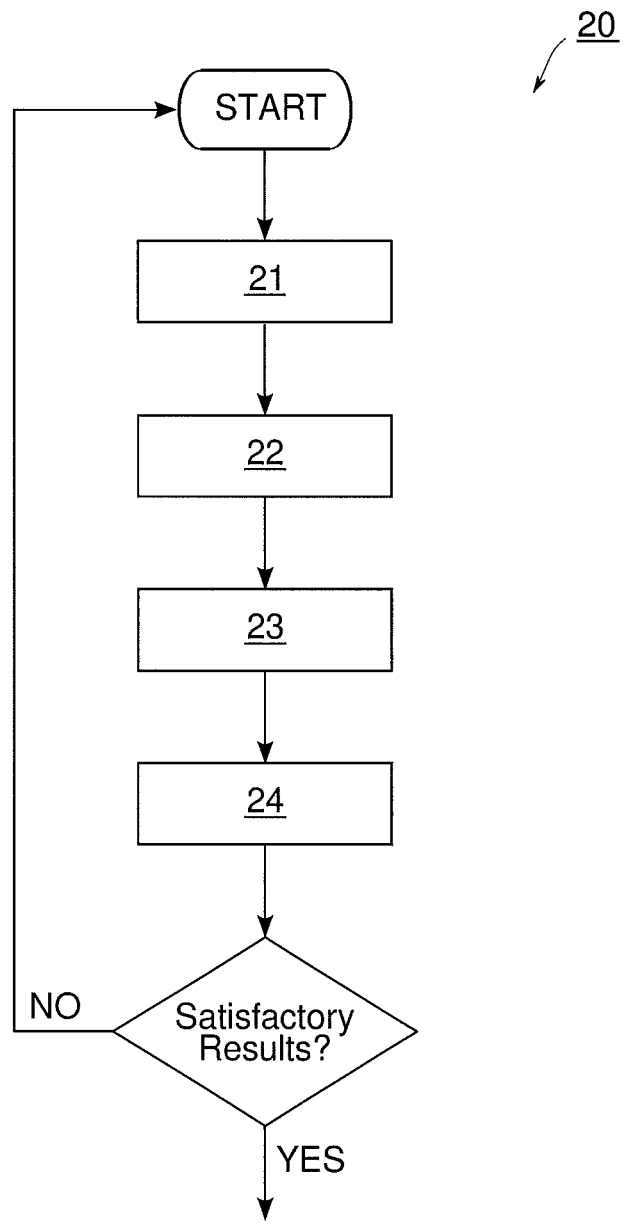
FIG. 2 shows a schematic flowchart of an exemplary embodiment of a method for data mining.

FIG. 2 illustrates a flowchart of an exemplary embodiment of a method 20 for data mining.

Method 20 comprises an act 21 of executing one or more of a plurality of data mining algorithms based on control parameters to discover a plurality of result patterns in a data set. Further, method 20 includes an act 22 of presenting the discovered result patterns to a user and an act 23 of receiving information on one or more of the result patterns selected by the user according to the user's subjective interest. In an act 24 the control parameters are automatically updated based on the received information on the user-selected result patterns.

For method 20 the user does not need to have any knowledge on technical details of the mining algorithms and/or the required parameters. The user may be merely confronted with the search results of the executed mining algorithms in form of presented result patterns. For example, they may be presented to him via an interactive Graphical User Interface (GUI). By investigating the result patterns and providing the user's feedback on his interest in one or more of those patterns (for example by selection), the control parameters of the underlying mining algorithms may be automatically learned and updated. Thereby the user does not need to manipulate the control parameters. In particular, the GUI may allow meaningfully interpret "natural" user actions as preferences among different result patterns.

The data mining method 20 may be an iterative method which may be finished if the user finds the latest presented result patterns satisfying. This may be the case if the presented result patterns are found to be adequate for answering a certain question the user has in mind, for example. However, if the user wishes to have more specific result patterns, he may initiate a further iteration of method 20 comprising the acts 21 to 24 based on his latest selection of previous results. For example, this may be done by pressing or clicking a button provided on the interactive GUI.

Some examples of underlying data mining algorithms include the C4.5 or C5.0 algorithms generating classifiers expressed as decision trees, the k-means algorithm as an iterative method to partition a given dataset into a user-specified number of clusters, so-called Support Vector Machines (SVM), the a-priori algorithm, the Expectation-Maximization (EM) algorithm—just to name a few. The skilled person having benefit from the present disclosure will appreciate that the act of executing 21 the plurality of data mining algorithms may comprise executing the plurality of data mining algorithms on a programmable hardware device. In some embodiments, the plurality of data mining algorithms may either be executed in parallel (contemporary). In other embodiments, the plurality of data mining algorithms may be executed serially (subsequently, one after the other).

After having executed one or more data mining algorithms, their result patterns discovered based on the latest control or model parameters may be presented to a user via GUI on a display for example. An example of a visual layout is illustrated in FIG. 3.

Discovery Process and Visual Elements

The illustrated example GUI 30 includes a "mining" button 31, a result candidate area 32, a result analysis board 33, a trash can 34, and data view 35. In one embodiment, the user is not occupied with the technicalities of the data mining workflow, but instead may focus on investigating the produced result patterns (in the result candidate area 32) on a semantic level. The following discussion describes some exemplary visual elements that may support this investigation, and explains how interactions with these elements may be incorporated into a sensible discovery process to produce useful result patterns.

Figure 3:
FIG. 3 illustrates an example of a visual layout of a graphical user interface that contains mine-button, a result candidate area, a result analysis board, a trash can, and a data view.

In the example of FIG. 3 a characteristic visual element is the mine button 31, which the user may press or click in order to see new or updated mining results, for example after having provided his feedback to previous results. That is to say, pressing button 31 may trigger the act 21 of executing one or more of a plurality of data mining algorithms based on current control parameters in order to discover a plurality of new or updated result patterns in an available data set which may be stored in a database, for example. As will be explained below the one or more data mining algorithms may be executed in the background and only the produced result patterns may become visible to the user (e.g. in the result candidate area 32). Implicitly, pressing button 31 may also indicate that the user is done with inspecting the previous result patterns that have been displayed before (e.g., from a previous iteration).

Figure 4:
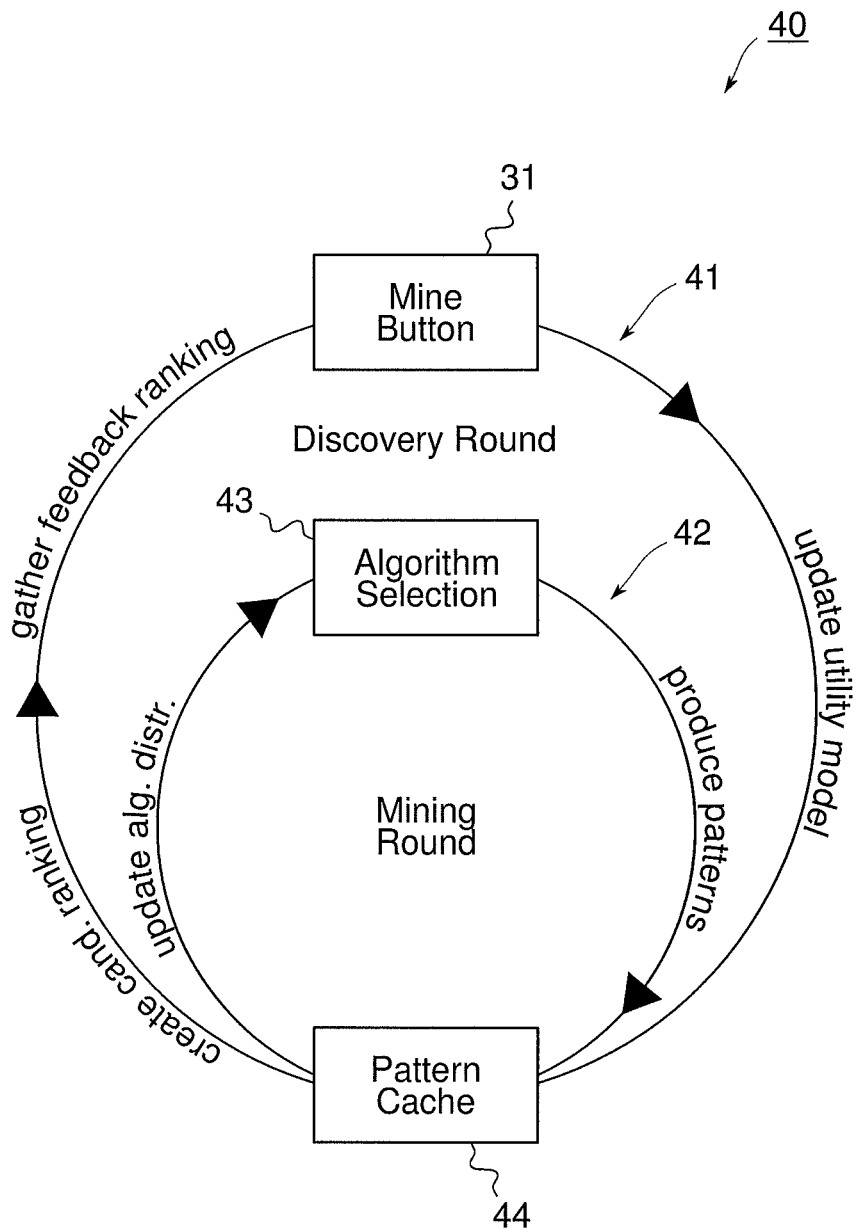
FIG. 4 shows a temporal structure of the pattern discovery process according to an embodiment.

Moreover, the result candidate area 32 may be used to present ranked mining result patterns. From here the user may investigate results, delete those that he considers useless by drawing them to the trash can 34, and move those which he wishes to use for further analysis to the result analysis board 33. For example, we may derive from the fact that the user drags pattern proposal number 3 from the result candidate area 32 to the result analysis board 33 that he would rather like pattern number 3 than number 1 or 2. These visual elements may support an interactive discovery process 40 as illustrated in FIG. 4.

The exemplary pattern discovery process 40 may comprise one or more pattern discovery rounds or acts 41. A pattern discovery act 41 may comprise one or more data mining rounds or acts 42. A data mining act 42 may comprise updating a data mining process (algorithm) selection probability distribution. Based on the updated selection probability distribution a data mining algorithm may be selected and executed (see reference numeral 43) to produce result patterns that may be stored in a result pattern cache 44. Based on the content of the result pattern cache 44 a ranking of candidate patterns may be proposed and presented in the result candidate area 32. The user may provide his feedback with respect to his interest in the present patterns. Based on this feedback a new pattern discovery act 41 may be started and the control parameters, which may be coupled to or correspond to parameters of the utility or interestingness model $\hat{u}_t$ for the data mining algorithms, may be updated.

In some embodiments, the main temporal units of the discovery process are pattern discovery acts $t \in \mathbb{N}$ that may correspond to the period between two consecutive activations of the mine button 31. In FIG. 4 this discovery period or act corresponds to the outer circle 41. As further, more refined, temporal structure, during each discovery act 41 there may be a number of mining acts $l \in \mathbb{N}$, each of which corresponds to a background execution of a mining algorithm. In FIG. 4 a mining period or act corresponds to the inner circle 42. The last mining act 42 within a given discovery act 41 may be terminated preemptively in order to end synchronously with this discovery act. Hence, every mining act 42 can be associated to a unique discovery act 41. We may count mining acts consecutively and denote by $t(l)$ the discovery act in which mining act l occurs and conversely by $l(t)$ the first mining act within the discovery act t.

In some embodiments, an individual mining act l may comprise first selecting a mining algorithm $m_l$ at random according to a probability distribution for algorithm selection $\pi_l: \mathcal{M} \to [0, 1]$, running $m_l$ and fetching its result patterns $P_l$. Hence, prior to executing a data mining algorithm the data mining algorithm may be randomly selected from the plurality of data mining algorithms based on an algorithm selection probability distribution function $\pi_l$.

All mining results may then be stored in the pattern cache 44, for which we may denote by $C_l \subseteq \mathcal{P}$ the state before the results of mining round l are added. That is to say, upon executing a data mining algorithm, one or more discovered result patterns may be added to a pattern cache memory, leading to a change of state of the pattern cache memory. The cache may have a finite cache capacity $c \in \mathbb{N}$ such that at all times l it is enforced that $|C_l| \le c$.

Finally, the performance of mining algorithm $m_l$ may be assessed by comparing $C_l$ and $C_{l+1}$ using a current approximation of the pattern utility model defined below. In other words, a performance of the executed data mining algorithm $m_l$ may be assessed based on the change of state of the pattern cache memory and a current pattern utility model. Thereby the pattern utility model may control one or more control parameters of the data mining algorithms. Based on this information the algorithm selection probability distribution for the next round $\pi_{l+1}$ may be determined and automatically started. Said algorithm selection probability distribution may also be regarded as a control parameter of the data mining algorithm. Hence, an algorithm selection probability distribution may be updated based on the assessed performance and a next data mining algorithm $m_{l+1}$ from the plurality of data mining algorithms may randomly be selected for the next execution of mining act l+1 based on the updated algorithm selection probability distribution.

In the beginning of a discovery round t, a candidate ranking $r_t$ of size c may be constructed from the current state of the pattern candidate cache $C_{l(t)}$ and displayed in the result candidate area 32. Hence, presenting 22 the discovered result patterns may comprise proposing a ranking of candidate patterns based on a current state of the pattern cache memory storing one or more discovered result patterns. Formally, a ranking of patterns may be regarded as an ordered list $r = \langle r_1, \ldots, r_k \rangle \in \mathcal{P}^*$ such that $r_i \ne r_j$ for all $i,j \in [k]$. Let us denote by $\{r\} = \{r_1, \ldots, r_k\}$ the (unordered) set of result patterns contained in the ranking, by $r^i = \langle r_1, \ldots, r_i \rangle$ the i-prefix of r for $i \le k$, and by $|r| = |\{r\}| = k$ the size of r. The set of rankings may be denoted by $\mathcal{R}$ and the set of all rankings of some fixed size c may be denoted $\mathcal{R}^c$. The ranking $r_t$ may be based on a current utility approximation $\hat{u}_t$ of the user-subjective pattern utility or interestingness u. In other words, the proposed ranking of candidate patterns may be computed based on the current pattern utility model $\hat{u}_t$.

After the user indicates that he is done with investigating the candidate ranking, for example by clicking the mine button 31, a feedback ranking $\bar{r}$ may be constructed from the user's actions. For a definition of this feedback ranking $\bar{r}$, let us denote by $T_t$ and $B_t$ all the result patterns that have been deleted to the trash can 34 and promoted to the result board 33 until the end of discovery act t, respectively. The feedback ranking $\bar{r}$ may comprise all result patterns that were promoted in that discovery act to the result board 33 followed by all result patterns in the candidate ranking $r_t$ that have been inspected by the user and were neither deleted nor promoted. Let $$x = \max\{i \in [c] \mid x_i \notin (B_{t+1} \setminus B_t) \cup (T_{t+1} \setminus T_t)\}$$

be the maximal index of a result pattern that has been either promoted or deleted during discovery act t. Formally, the feedback ranking may be defined by $$\bar{r}_t = \langle b_1, \ldots, b_k, r_{i_1}, \ldots, r_{i_l} \rangle,$$

where $\{b_1, \ldots, b_k\} = B_{t+1} \setminus B_t$ in the order of their promotion and $\{r_{i_1}, \ldots, r_{i_l}\} = \{r_t^x\} \setminus (B_{t+1} \cup T_t + 1)$ with $i_j < i_{j'}$ for $j < j' \le x$. At the end of the discovery act t, a new utility approximation or model $\hat{u}_{t+1}$ may be inferred by comparing candidate feedback ranking $\bar{r}_t$ with ranking r and the next discovery round t+1 may start. Hence, updating the pattern utility model may be based on a comparison of the feedback ranking with the proposed ranking of candidate patterns. However, updating the pattern utility model does not necessarily need to be made at a level of the rankings. One could also apply methods from Preference Learning, working directly on individual pairwise comparisons. An example would be to select a parameter vector according to the specification of l preference pairs (p, n) (user prefers pattern p over pattern n) as a solution of the following support vector machine optimization problem:

$$\min \Sigma_{i=1, \ldots, l} \max(0, 1 - \langle w, \varphi(p_i) - \varphi(n_i) \rangle + \|w\|.$$

Learning and Construction of Rankings

We now turn to details of an exemplary ranking mechanism that may be used in a discovery act 41 in order to compute a candidate ranking from the content of the result pattern cache 44. With this exemplary mechanism we may aim for two goals: firstly, we want to allow the user to find new patterns that are maximally relevant in terms of his specific utility or interestingness preferences, and, secondly, we want to provide him a sufficient amount of diversity in the displayed mining results. The latter goal may be important in a user-based search process, because if the user is not able to express previously unspecified aspects of his preferences the whole discovery process can get stuck in a local maximum.

In order to achieve these goals, we may, for example, modify the co-active learning process proposed in Pannaga Shivaswamy and Thorsten Joachims, "Online structured prediction via coactive learning", in proceedings of the 29th International Conference on Machine Learning, (ICML 2012), 2012 and K. Raman, P. Shivaswamy, and T. Joachims, "Online learning to diversify from implicit feedback", in proceedings of the 18th ACM SIGKDD international conference on Knowledge discovery and data mining, pages 705-713. ACM, 2012, for maintaining a parameter vector $w_t$ of a ranking utility function $$\hat{u}_t(r) = \langle w_t, \varphi(x_t, r) \rangle$$

over the discovery rounds $t \in \mathbb{N}$. This exemplary ranking utility function is defined by a joint feature map $\varphi: Z \times \mathcal{R} \to \mathcal{R}^{\mathcal{F}}$ that maps a pattern ranking together with the current system state to an $|F|$-dimensional real-valued feature vector, i.e., the feature representation is determined by the set $\mathcal{F}$ of interestingness functions. The system state $x_t \in X$ in discovery round t may be given by the contents of the pattern cache, the result board 32, and the trash can 34, respectively, i.e., $x_t = (C_{l(t)}, B_t, T_t)$. The component of $\varphi$ corresponding to function $f \in \mathcal{F}$ may be defined as a discounted aggregate of the individual patterns' contribution to feature $f$, i.e., $$\varphi_f(x_t, r) = \left\| \left( \frac{\delta(x_t, r_i) \varphi_f(r_i)}{\log(i+1)} \right)_{i=1}^{|r|} \right\|_d,$$

where $\varphi_f(r_i)$ is given by the feature map for individual patterns (defined below) and $\delta(x_t, r_i)$ is an indicator function that is 1 if pattern $r_i$ is neither already present on the result board $B_t$ or in the trash can $T_t$ and 0 otherwise. The choice $d \in \mathbb{N} \cup \{\infty\}$ of the above d-norm is a diversity parameter that determines the trade-off between relevance and diversity when evaluating a ranking.

Alternatively, also ranking scores can be used that directly model the trade-off between utility and diversity on the single pattern level. For that one can define the ranking utility function at discovery round t as $$\hat{u}(r) = \Sigma_{i=1}^{|r|} f(r_i, \{r_1, \ldots, r_{i-1}\}),$$

where $f$ is a function modeling a mixture of relevance of a pattern weighted by the distance to patterns already shown higher in the ranking. For example, the i-th pattern $p_i$ may be selected in the candidate ranking 32 to maximize $$f(r_i, \{r_1, \ldots, r_{i-1}\}) = u_t(r_i) \min_{j=1 \ldots i-1} d(r_i, r_j),$$

where $$d(u, v) = 1 - \frac{\langle \varphi(u), \varphi(v) \rangle}{\|\varphi(u)\| \|\varphi(v)\|}$$

denotes the cosine similarity resulting from the pattern feature map $\varphi(x) = (\varphi_f(x))_{f \in \mathcal{F}}$, i.e., the vector resulting from applying the different interestingness functions to a pattern x.

The feature map for the individual patterns may be designed to allow a maximal cross-pattern inference and at the same time to only require minimal attention of the user: while the actual pattern p can only contain the values for some base interestingness functions, the feature vector of pattern p may also contain values for all interestingness functions that the user can infer from these base functions. For example the rationale 12 of the pattern in FIG. 1 contains only the interestingness functions $f_{frq}$ and $f_{dtv}$. However, this is enough to infer also the values for the multiplicative combinations $f^b_{frq}$, and, $f^t_{dv}$, hence, we can also use these in the feature representation of the pattern. Formally, the individual components of the pattern feature map may be defined by $$\varphi_f(s, X) = \begin{cases} f(s), & \text{if } f \in \hat{X} \\ 0, & \text{otherwise} \end{cases},$$

where $\hat{X}$ denotes the set of all feature functions in $\mathcal{F}$ that can be computed based on functions in the rationale X, i.e., $$\hat{X} = \{f \in \mathcal{F} : f_1, \ldots, f_k \in X, f(s) = g(f_1(s), \ldots, f_k(s) \cdot s)\}.$$

This means the feature representation of a pattern may comprise all function values of interestingness functions in the rationale X and those that can be inferred from these values. Other features—that are not in X or that cannot be inferred from X—may be set to zero. Note that feature functions that only depend on the pattern descriptor (such as the relative shortness $f_{sho}$) may always be part of $\hat{X}$. Hence, if $\mathcal{F}$ contains features such as descriptor length and indicator features for the presence of the specific constraints, then these features may be relevant for all patterns. With the definition of the ranking utility we can now specify the candidate ranking $r_t$ that may be displayed to the user at the beginning of every discovery round t. Naturally, one would want this to be the optimal ranking of length c (cache capacity) with respect to the current model, i.e., $$r_{opt}^c(C_{l(t)}) \in \arg\max\{\hat{u}_t(x_t, r) : r \in \mathcal{R}^c(C_{l(t)})\}.$$

Unfortunately, using a reduction from the max-k-cover problem (see, e.g. Uriel Feige, Vahab S Mirrokni, and Jan Vondrak, "Maximizing non-monotone submodular functions", SIAM Journal on Computing, 40(4):1133-1153, 2011), one can show that it is NP-hard to compute this optimal ranking and even to approximate one within a ratio larger than (1−1/e). This holds already for very simple feature spaces $\mathcal{F}$. On the other hand, a greedy ranking $r_{grd}^c(P)$ can be constructed efficiently by the following algorithm:

---
Algorithm 1 Greedy ranking
---
Require: Patterns $P \subseteq \mathcal{P}$, size $c \in \mathbb{N}$ utility fct u: $\mathcal{R} \to \mathbb{R}$
Ensure: Ranking $r_{grd}^c(P)$ s.t. $u(r_{grd}^c(P))/u(r_{opt}^c(P)) \geq 1/3$
1. for i = 1, ..., c do
2.     set $r_i \in \arg\max_{p \in P \setminus (r_1, \ldots, r_{i-1})} u((r_1, \ldots, r_{i-1}, p))$
3. return $(r_1, \ldots, r_c)$
---

Algorithm 1 iteratively grows a solution by adding in each step to the current partial ranking the pattern that maximizes the utility. For all pattern sets $P \subseteq \mathcal{P}$ this solution can be computed in time $O(c|P|)$ and satisfies the approximation guarantee:

$$\hat{u}_t(r_{grd}^c(P))/\hat{u}_t(r_{opt}^c(P)) \geq 1/3.$$

This result can be proven by observing that the space of partial rankings can be represented by the intersection of two Matroids and that a is sub-modular with respect to that set system. In this context, a Matroid is a structure that captures and generalizes the notion of linear independence in vector spaces. The approximation guarantee then follows from a general performance theorem for the greedy algorithm, see Marshall L Fisher, George L. Nemhauser, and Laurence A. Wolsey, "An analysis of approximations for maximizing submodular set functions—II", in Polyhedral combinatorics, pages 73-87, Springer, 1978. Finally, we can specify how to update the parameter vector of the ranking utility at the end of each discovery round. Following K. Raman, P. Shivaswamy, and T. Joachims, "Online learning to diversify from implicit feedback" in Proceedings of the 18th ACM SIGKDD international conference on Knowledge discovery and data mining, pages 705-713. ACM, 2012, we may update by the following multiplicative utility update rule $$w_{t+1,f} = w_{t,f} \exp(\theta_t(\varphi_f, T_t) - \varphi_d(r_t)))/Z \quad (2)$$

where Z is a normalization factor that ensures that $\|w_t\|_2 = 1$ and $\theta_t = 1/(2S\sqrt{2^{(\log t)}})$ is a decreasing utility or interestingness learning rate depending also on a bound $S \geq \max_{r,B}\|\varphi(r)\|_\infty$ on the max-norm of all rankings (e.g., $S = c^{1/d}$). The approximation guarantee of the greedy algorithm and a certain guarantee on the quality of the user feedback imply that this update mechanism has a controlled regret over an optimal weight vector. Hence, in embodiments the proposed ranking of candidate patterns may be computed based on a greedy algorithm (e.g. algorithm 1) maximizing a ranking utility or interestingness function at each stage.

Online Control of Mining Algorithms

We now discuss the algorithm selection distribution $\pi_l$ that is used in mining act 1. As mentioned earlier, we may consider the output of mining algorithms as random variables following a distribution that depends on the available running time and possibly other inherent randomness in case the algorithm is a Monte Carlo algorithm. In order to assess the data mining performance, the system can only observe the output of algorithms that it actually uses and initially the performance of all algorithms are unknown. Thus, the system is facing an exploitation/exploration problem of the multi-armed bandit style (see, e.g., Nicolo Cesa-Bianchi and Gabor Lugosi, "Prediction, learning, and games", Cambridge University Press, 2006). In order to apply known strategies for this kind of problem, we may first model the reward that is generated by a data mining algorithm when it is executed.

Let us $P_l$ denote the result pattern set returned by the mining algorithm executed in round l (denoted by $m_l \in \mathcal{M}$) and by $c_l$ the computation time it used to produce these results. Then the mining performance of round l may be quantified by the utility gain per time of the ranking that can be constructed from the old and the new patterns together, i.e., by $$(u(r_{opt}(P_i \cup \{r_{t(l)}\})) - u(r_{t(l)}))/c_l.$$

Of course, the system has no access to the true utility or interestingness function and cannot compute an optimal ranking efficiently. Hence, it may rely on its current approximation $\hat{u}_{t(l)}$ and the greedily approximated ranking to estimate the performance, i.e., it may use the estimated relative utility gain $$g_l = (\hat{u}_{t(l)}(r_{grd}(P_i \cup \{r_{t(l)}\})) - \hat{u}_{t(l)}(r_{t(l)}))/c_l.$$

Thus, the observed reward generated by a mining algorithm may not only depend on the current system state but also on the current approximation of the user utility, both of which evolve over time. This means that we need an exploitation/exploration strategy that is robust to non-stationary rewards. To this end, we may employ an algorithm of Cesa-Bianchi and Lugosi (see Nicolo Cesa-Bianchi and Gabor Lugosi, "Prediction, learning, and games", Cambridge University Press, 2006, page 160) that has an optimally bounded regret. Throughout all mining rounds $l \in \mathbb{N}$, it maintains performance potential weights $v_l \in \mathbb{R}_+^k$ starting with $v_1 = (1, \ldots, 1)$. The algorithm $m_l$ to run in mining round l may then be chosen at random according to the algorithm selection distribution $\pi_l \in [0,1]^k$, which may be a mixture of the distribution given by v and the uniform distribution, i.e., it is given by $$\pi_{l,i} = ((\gamma_l - 1)v_i)/V + \gamma_l/k,$$

where V normalizes the sum of the entries of v to one. The bandit mixture coefficient $\gamma_l$ depends on the mining round and will be specified below. After the result of a mining round is observed the potentials are updated multiplicatively by the bandit update rule $$v_{l+1,i} = v_{l,i} \exp(\eta_l \bar{g}_{l,i})$$

where $\eta_l$ is the bandit learning rate $\eta_l = \gamma_l/(2k)$ and $\bar{g}_{l,i}$ an optimistic estimator of the performance of data mining algorithm i in round l that may be defined by $$\bar{g}_{l,i} = \begin{cases} (g_l + \beta_l)/\pi_{m_l}, & \text{if } i = m_l \\ \beta_l/\pi_{m_l}, & \text{otherwise} \end{cases}$$

By choosing $$\beta_l = \sqrt{\ln(10k)/k 2^{(\log l)}}$$

one can make sure that the bias of the performance estimates is not too large while still being optimistic with high probability. Depending on $\beta_l$ one can also chose the bandit mixture coefficient as $\gamma_l = 4k\beta_l/(3+\beta_l)$.

The ideas presented above may be summarized in the following process/algorithm.

---

Algorithm 2 One-click Mining

Initialization:
1. init utility weights $w_1 \leftarrow (1, \ldots, 1)/|F|$
2. init performance weights $v_1 \leftarrow (1, \ldots, 1)$
3. init discovery and mining round t, l $\leftarrow$ 1
4. draw algorithm m $\in \mathcal{M}$ uniformly at random
5. run m blocking for time $c_{init}$ (result patterns P)
6. init candidate buffer $C_1 = P$ and present $r_{grd}(C_1)$ On Algorithm End:
1. update candidate buffer $C_{l+1} = C_l \cup P_l$
2. asses $g_l = (\hat{u}_{t(l)}(r_{grd}^c(C_{l+1})) - \hat{u}_{t(l)}(r_{grd}^c(C_l)))/c_l$
3. for all i $\in \mathcal{M}$ do
4. $\bar{g}_{l,i} \leftarrow \begin{cases} (g_l + \beta_l)/\pi_{m_l}, & \text{if } i = m_l \\ \beta_l/\pi_{m_l}, & \text{otherwise} \end{cases}$
5. $v_i v_i \exp(\eta_l \bar{g}_{l,i})$
6. l $\leftarrow$ l + 1
7. run algorithm $m_l \sim \pi_l$ in background where
$\pi_{l,i} = (1 - \gamma_l)v_i/V + \gamma_l/k$ On Mine Click:
1. assess feedback ranking $\bar{r}_t$
2. for all f $\in$ F do
3. $w_{t+1,f} = w_{t,f} \exp(\theta_t(\phi_f(\bar{r}_t) - \phi_f(r_t)))$ -continued Algorithm 2 One-click Mining 4. terminate current algorithm $m_l$
5. construct and show greedy ranking = $r_{t+1} = r_{grd}(C_{l-1})$
6. reset $C_l = \{r_{t+1}\}$
7. $t \leftarrow t + 1$ Note that algorithm 2 is a compressed listing that may need a slight addition in order to avoid concurrency issues: When the mine-click procedure terminates the currently running mining algorithm, this may trigger a call of the algorithm-end procedure. In this case the algorithm-end procedure should only be carried out until step 6 and the new mining algorithm is only started after the remaining steps 5-7 of the mine-click procedure are finished.

Figure 5:
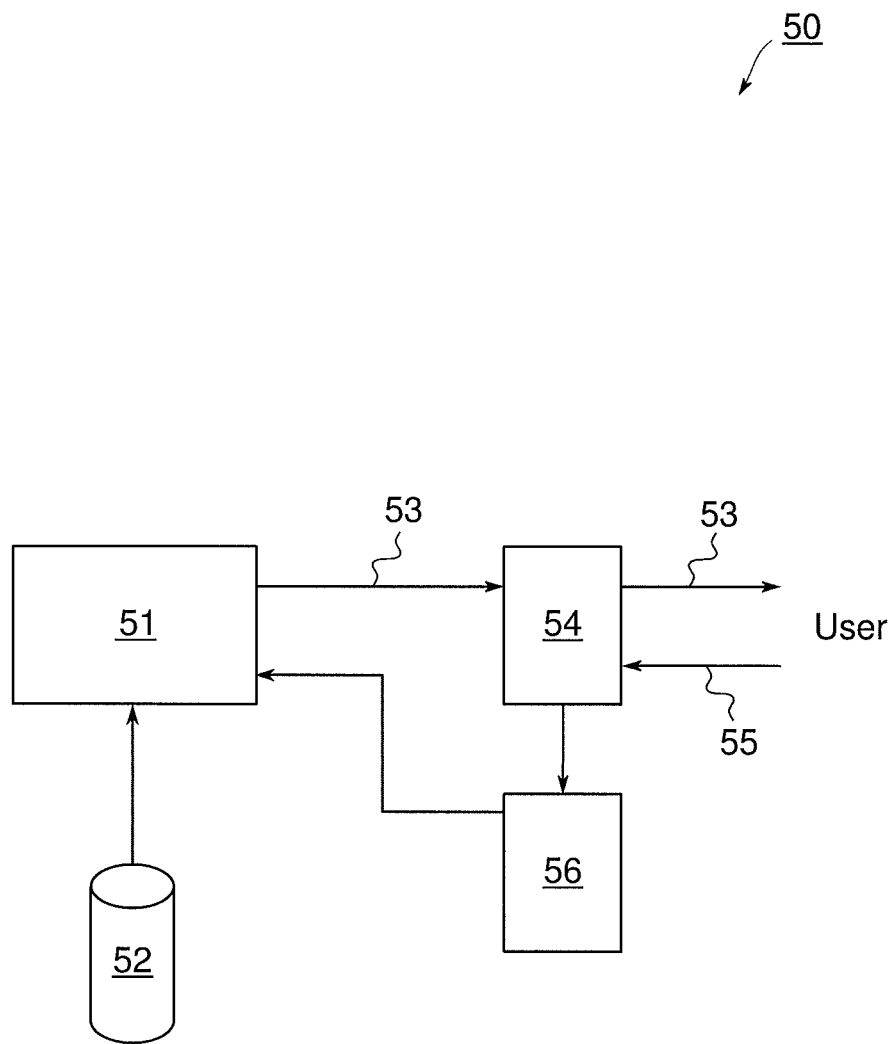
FIG. 5 shows a simplified schematic block diagram of an exemplary embodiment of an apparatus for data mining.

The above illustrated methods and acts may be performed by an apparatus for data mining. A simplified block diagram of an exemplary embodiment is illustrated in FIG. 5.

Apparatus 50 includes processing circuitry 51 which may be configured to execute stored instructions (stored in the circuitry or another medium/device) to execute one or more of a plurality of data mining algorithms based on control or utility model parameters to discover a plurality of result patterns 53 in a data set. Thereby the data set may be stored in a database 52. The apparatus 50 may further include an interface module 54 configured to present the discovered result patterns to a user and to receive information 55 on one or more of the presented result patterns selected by the user according to the user's subjective interest. Hence, the interface module 54 may comprise a bidirectional interactive user interface. Apparatus 50 also includes processing circuitry 56 which is configured to automatically update the control or utility model parameters based on the information 55 on the user's subjective selection or choice of result patterns. The updated control/model parameters 57 may be fed back to processing circuitry 51 for further executing one or more data mining algorithms based on the updated control parameters 57.

In order to provide an illustration of the proposed approach, we present an exemplary pattern discovery session performed by a prototypical implementation. In this session, we deal with the pattern discovery use case of election analysis (see Henrik Grosskreutz, Mario Boley, and Maike Krause-Traudes, "Subgroup discovery for election analysis: a case study in descriptive data mining", in Discovery Science, pages 57-71, Springer, 2010).

The exemplary prototype is configured to combine association and subgroup discovery, both with a range of interestingness functions that is able to express different trade-offs between pattern frequency and lift or target deviation, respectively. In addition there are functions that express certain preferences on the form of the pattern only, i.e., its descriptor. On the algorithm side, there is a mixture of eight deterministic beam-search and randomized pattern sampling algorithms. More precisely, the pattern language $\mathcal{L}_{bcm}$ of the prototype is the combination of association and subgroup patterns, i.e., $\mathcal{L}_{bcm} = \mathcal{L}_{asd} \cup \mathcal{L}_{sgd}$. The feature functions $F_{bcm}$ can be separated into three groups, i.e., $\mathcal{F}_{bcm} = \mathcal{F}_{sgd} \cup \mathcal{F}_{asd} \cup \mathcal{F}_{dsc}$, where $\mathcal{F}_{sgd}$, $\mathcal{F}_{asd}$, and $\mathcal{F}_{dsc}$ are sets of subgroup discovery, association discovery, and descriptor functions, respectively.

The subgroup discovery features $\mathcal{F}_{sgd}$ contain the functions given by Eq. (1) for the three choices of b equal to 0, ½, and 1. Analogously, the association functions contain the same trade-offs with frequency, but with the target deviation measure replaced by the lift measure $f_{ass}$. Also pattern frequency is included for both pattern classes. Finally, the descriptor features contain the relative shortness $f_{sho}$ along with binary indicator functions $f^d_{cns}$ that signal whether attribute d is present in the descriptor or not, i.e., $f^d_{cns}(s)=1$ if $d \in attr(s)$ and $f^d_{cns}(s)=0$ otherwise. For subgroup patterns there are in addition similar features that can express affinity for a specific target attribute, i.e., for all $t \in [n]$ the feature $f'_{trg}(s, t')$ that takes on the value 1 if and only if $t=t'$. For the resulting feature space $\mathcal{F}_{bcm}$ we have for all patterns $p \in \mathcal{P}$ that $\varphi_f(p) \in [0, 1]$. Hence, we can use the bound $S=c^{1/d}$ for setting the learning rate for the utility updates as defined in Eq. (2) where c denotes as usual the capacity of the pattern cache.

The employed set of exemplary algorithms $\mathcal{M}_{bcm}$ comprises four direct pattern sampling and four beam search algorithms such that from each group there are two algorithms for each discovery task. Direct pattern sampling produces random pattern collections as the outcome of fast appropriately biased random experiments without constructing auxiliary parts of the pattern space (see M. Boley, S. Moens, and T. Gärtner, "Linear space direct pattern sampling using coupling from the past", in Proceedings of the 18th ACM SIGKDD international conference on Knowledge discovery and data mining, pages 69-77, ACM, 2012, from which we also use the complementary pattern sampling library1).

All exemplary algorithms preprocess the data by discretizing numerical attributes into high and low bins. In the case of subgroup discovery all exemplary algorithms draw the target attribute at random according to the distribution given by the current weights for the target preference features. The exemplary beam search algorithms then directly optimize either subgroup or association interestingness; finding the top-10 patterns with a beam size of 5 or 10, respectively. For the example sampling algorithms appropriately constructed pattern distributions are chosen: For association discovery we use distributions that are biased towards patterns with a high frequency on the one side but that contain individual constraints with a low frequency on the other side. This favors the production of patterns with a high lift. For subgroup discovery we split the dataset into two parts corresponding to high and low values of the target attribute and sample patterns discriminating these parts.

For this proof of concept we used data from the domain of socio-economics and politics, which can be used to investigate a diverse set of understandable and interpretable analysis questions. Specifically, we constructed a table from publicly available database provided by the German Federal Office of Statistics. This database provides a wide range of statistical variables mapped to regional units of Germany.

For our table, we let the data records correspond to the 413 administrative districts of Germany (Landkreise), which is the second finest spatial resolution provided in the database. Each district is described by 39 attributes that can be roughly grouped into socio-economical and political variables. In terms of socio-economic attributes we selected variables from the following categories: age structure and education of the population, economic indicators (e.g., GDP growth, unemployment), and structure of the labor market (workforce in different sectors such as production, public service, etc.). In terms of political attributes, we added the election results of the five major political parties for the federal elections in 2005 and 2009, respectively: CDU (conservative), SPD (center-left), GREEN (center-left), FDP (liberal), and LEFT (left-wing).

We report some results of an exemplary analysis session to illustrate the system behavior. For this we assume that the user starts at first with a very general purely exploratory analysis intent on order to get an overview before she turns to attack more specific questions. That is, we assume the following analysis question for phase 1.

Phase 1—General Question

What Attribute/Value Combinations Show a Strong Correlation in the Data?

While following this intent, the user investigates and promotes mostly fairly general association patterns, while he deletes too specific and in particular subgroup patterns. During the first discovery rounds the produced matching candidate patterns are dominated by those that reflect the well-known fact that political parties have relatively stable regional strongholds. This means there are a lot of patterns of the form "party 2005=high/low, party 2009=high/low". Then, after a few rounds, more space in the candidate area is devoted to association patterns. Consequently a higher diversity of them with more non-trivial correlation is offered. For instance, the patterns shown in FIG. 6 have been produced between discovery rounds 5 and 15. These patterns confirm some known associations between attributes. CDU is strong in the economically strong regions of the south of Germany that show low unemployment. Conversely, CDU also and its economically liberal coalition partner FDP are weaker in economically problematic areas with high unemployment and little industry. Other patterns in the set appear to be plausible and could be interesting for further investigation.

After this initial exploratory phase, we now turn to a much more specialized analysis question, in which we try to find explanations for the 2009 election results of some specific parties.

Phase 2—Specific Question

What Socio-Economic and Regional Factors Favored Parties from the Left Spectrum in the German 2009 Federal Election?

This question implies that we are interest in subgroup patterns with the three targets SPD, GREEN, and LEFT. At the same time, we are interested in socio-economic and regional explanations only, which means that we do not want to see descriptor elements of other parties (or the same party in the 2005 election). Correspondingly, while following this analysis question, the user deletes general association patterns and those subgroup patterns that do comply with the descriptor restrictions mentioned above. Again, just as in phase 1, in the beginning the produced candidates are dominated by the obvious correlations between party attributes.

Additionally, now we also have a much more narrow focus of suitable pattern forms, because we are not interested just in any subgroup pattern but only in those with having a target from a set of 3 out of 39 attributes. Consequently, this time it takes longer until suitable patterns show up in the result area. The patterns shown in FIG. 7 have been produced between discovery rounds 10 and 30. Again the patterns partially confirm some known party preferences (note that a high area code corresponds to the south/east and a low area code to north/west regions). For instance it is known that SPD has a relatively high result among older voters, while GREEN is strong in the densely populated urban areas. Finally, LEFT is known to be strong among areas in the east and particularly in economically weak areas with high unemployment.

To summarize, one underlying problem of the present disclosure is the computerized detection of peculiarities and explanations (or observations) of data sets for applications which cannot obviously be associated with a single common method of analysis with a standard parameterization. Conventional data analysis software tries to solve such problems by providing as many procedures as possible with detailed parameterization. In this way, the user should be able to specify the processes to be executed on an operational level as precisely as possible, with the objective that the specified method leads to observations that are useful in answering the underlying questions related to the particular application.

The present disclosure presents a general framework for combining different pattern discovery methods and algorithm into a single "one-click mining system". As a proof of concept of these ideas, we constructed a prototype that includes association and sub-group discovery. In a preliminary evaluation we saw that the resulting system is able to produce patterns corresponding to certain simple analysis goals without exposing the user to the technical side of the pattern mining method and its algorithms.

The embodiments described herein provide new, iterative data mining approaches, in which:
1. The outputs of one or more data analysis methods (using one or more standardized parameterizations to begin with, and later in an adaptive way as outlined in act 3b) may be provided to the user for use and assessment within an interactive surface. The results may be presented in such a way that the following observations are treated with priority:
   a. results which are relevant (for example, first using a standardized relevance, and later in an adaptive way according to a model of subjective user preference; see item 3a), and
   b. results which are also as different as possible from observations which have already been made (diversification component). This mixture of relevance and diversity may be created by using a sub modular ranking algorithm, for example.
2. The platform mentioned in item 1 above may be designed in such a way that, through its operation (i.e. from interaction with the results obtained from act 1), subjective user preferences emerge from the individual observations/results that have been generated by the data analysis methods (data mining methods). For example, certain algorithmically generated observations could be used for deeper analysis, while others could be deleted.
3. From these implicitly communicated preferences, control signals may be generated which are sufficient to further control the underlying data analysis/mining algorithms and the processing of their results (see act 1) in such a manner that they will constantly converge towards the specific target which the user is following through data analysis, and which he can implicitly communicate through natural user interaction. To accomplish this, two adaptive sub-components may be used:
   a. a model of user preferences, that is able to assess the usefulness of each algorithmically generated observation/result, based on a number of characteristics (e.g., description length, coverage of input data, statistical conspicuity index of the statement described) of such observations, taking into account the user's specific target for the analysis. This model may be continually adapted, based on the subjective preferences generated in act 2, using statistical learning methods (e.g. Support Vector Machine, Artificial Neural Networks, etc.).

b. a model for resource allocation of the algorithms used in act 1 (including their parameterization variations) which, based on the results obtained and an assessment of their usefulness (done through act 3a), can estimate the production potential of all the algorithms while taking into account the current system state. For this purpose, procedures can be used for online decision optimization (e.g. Exp3 or other methods of reward maximization in Multi-armed Bandit Settings).

acts 1 to 3 may be carried out continuously until the user is satisfied with the analysis results obtained.

To illustrate embodiments of the proposed solution, we have considered a concrete application in empirical social research. Suppose that a record of public statistical surveys on demography, infrastructure and economic Indicators is to be gathered through computer-aided data analysis in order to answer the following question:

What local site factors contribute to economic prosperity?

A person who pursues this question on the basis of such a record, and who wants to rely on automated processes, will face a number of problems, including:

1. In effect, several method classes exist which would enable answers to this question to be obtained; two examples would be extraction by association (finding strong relationships between data attributes) and subgroup discovery (finding easily definable segments of the population exhibiting statistical significance in terms of a particular target attribute), since both these classes are basically able to contextualize demographic and economic variables.

2. All eligible method classes can be parameterized differently, and it is unclear which parameterization will produce the most useful observations for the present question and the present data. For example, the question of economic prosperity may present a variety of target attributes (high GDP growth, large number of start-up companies, low number of insolvencies), one of which should be chosen as the target variable (in the case of subgroup discovery), or referenced (in the case of association). A balance must also be struck between the generality of the description of the observation and its significance (in empirical social research, statements of a higher degree of specialization may well be more interesting than in marketing, although more emphasis is placed on statistical significance).

3. For all parameterizations, a variety of algorithms will normally come in question. By means of various optimization and search strategies, a set of observations can be identified in each case according to the chosen parameterization. Examples of subgroups include the exponential branch-and-bound algorithms and heuristic beam search algorithms. Again, it is not clear exactly which of these search strategies, using the current data set with the available computer resources, will lead to results of a sufficiently high quality in a reasonable amount of time.

4. Common algorithms usually produce a variety of results, many of which may not fulfill specific, not-formally-specified constraints, and may hence be useless in terms of the particular analysis subject. For the analysis given in the example, associations should contain at least one demographic attribute and one attribute covering economic prosperity. Subgroups should be described through demographic attributes and also have an economic target attribute. Among the results obtained, those have to be filtered out that actually meet these additional criteria.

Using previous analytical processes, the solution to all these problems has always demanded a large amount of technical knowledge. In contrast, an adaptive, automated analysis with natural user feedback will:

First present, in a short period of time, some of the results that have been produced on the basis of a uniform method mix. The user can select observations (see solution, act 2) which generally have a form that is conducive to the target analysis (associations and subgroups, the demographics with economic prosperity put in context and thereby having an adequate weighting of both significance and generality), and can also delete those from view which are not conducive to answering the question (observations that do not comply with the above-mentioned restrictions).

Enable these subjective preferences to be partially incorporated into the user preference model (act 3a), and subsequently adjust the model for allocation of computing resources (act 3b), so that more computing time is made available for algorithms to search for subgroups and associations, in order to produce more refined results. These results may once more be presented to the user through prioritized processing (act 1a)

At the same time, the diversification component (act 1b) will still present sufficiently different observations to always give the user the possibility to express previously unspecified aspects of his subjective interest. For example, it could be that in the first few runs through, no subgroup was considered with the target attribute of "number of insolvencies". The possibility of future viewing of such a subgroup is nonetheless ensured.

By iteration of these acts, the system may eventually come to observations which allow the user to answer the original analysis question, without having been confronted with the problems 1-4 as outlined above.

As explained in the example, the embodiments may enable the use of automated data analysis methods without the need for detailed knowledge of methodology and process. In particular, an analytical system can be configured based on a method according to embodiments, so that the user can concentrate fully on his or her role as an expert of the data domain, and on the semantics of algorithmically produced observations. This may increase productivity by accelerating user-system interaction and may eliminate the possibility of operating error on the part of the user. Potentially, it can also increase the quality of results and open up new user groups who had no previous knowledge of algorithms for data mining methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks shall be understood as functional blocks comprising circuitry that is adapted for performing a certain function, respectively. Hence, a "module or entity for s.th." may as well be understood as a "module or entity being adapted or suited for s.th.". A module or entity being adapted for performing a certain function does, hence, not imply that such means necessarily is performing said function (at a given time instant).

Functions of various elements shown in the figures, including any functional blocks may be provided through the use of dedicated hardware, such as "a processor", "a controller", etc. as well as hardware capable of storing and executing instructions commonly referred to as software. Moreover, any entity described herein as functional block, may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A method for data mining, comprising:
   a) executing one or more of a plurality of data mining processes based on control parameters to discover a plurality of result patterns in a data set, wherein the control parameters are computed based on a model of a single user's subjective user interest and based on a process selection probability distribution;
   b) presenting the discovered result patterns to a user;
   c) receiving information from one or more of the discovered result patterns selected by the user according to the user's subjective interest; and
   d) automatically updating the control parameters based on the selected result patterns;
   wherein the method is iterative, an iteration comprises acts a) to d), and a subsequent iteration uses the updated control parameters instead of the control parameters in act a), such that a subsequent iteration comprises executing one or more of the plurality of data mining processes based on the updated control parameters to discover a plurality of updated result patterns,
   wherein prior to executing the data mining process, the data mining process is randomly selected from the plurality of data mining processes based on a process selection probability distribution function,
   wherein the process selection probability distribution function for a data mining iteration 1 and data mining algorithm i is computed according to $$\pi_{l,i} = (\gamma_l - 1) v_i)/V + \gamma_l/k,$$

wherein V is a normalization factor, $v_i$ is a vector of performance potential weights for algorithm i, k denotes the total number of data mining algorithms, and $\gamma_l$ denotes a bandit mixture coefficient.

2. The method of claim 1, wherein the model of subjective user interest is a linear model of the form $u_t(p) = \langle w_t, \varphi(p) \rangle$, where $\varphi: P \to \mathbb{R}^d$ denotes a d-dimensional feature map from the space of possible patterns p, and $w_t \in \mathbb{R}^d$ denotes a model parameter approximation at time t.

3. The method of claim 1, wherein executing a plurality of data mining processes comprises executing the plurality of data mining processes on a programmable hardware device in parallel or serially.

4. The method of claim 1, wherein presenting the discovered result patterns comprises displaying the result patterns to the user via a graphical user interface.

5. The method of claim 1, wherein receiving information on one or more of the presented result patterns comprises receiving information on one or more result patterns considered relevant and/or one or more result patterns considered irrelevant.

6. The method of claim 1, further comprising:
   upon executing a data mining process, adding one or more discovered result patterns to a pattern cache memory, leading to a change of state of the pattern cache memory.

7. The method of claim 6, further comprising:
   assessing a performance of the executed data mining process based on the change of state of the pattern cache memory and a current pattern utility model.

8. The method of claim 7, wherein a process selection probability distribution is updated based on the assessed performance and wherein a next data mining process from the plurality of data mining processes is randomly selected for execution based on the updated process selection probability distribution.

9. The method of claim 1, wherein presenting the discovered result patterns comprises proposing a ranking of candidate patterns based on a current state of a pattern cache memory storing one or more discovered result patterns.

10. The method of claim 9, wherein the proposed ranking of candidate patterns is computed based on a current pattern utility model.

11. The method of claim 9, wherein the proposed ranking of candidate patterns is computed based on a greedy algorithm process that maximizes a ranking utility function at each stage.

12. The method of claim 9, further comprising determining a feedback ranking of patterns based on the user's actual subjective interest in one or more of the result patterns of the proposed ranking of candidate patterns.

13. The method of claim 12, wherein the feedback ranking is determined based on candidate patterns that have been declared by the user as relevant and based on candidate patterns that have been declared by the user as irrelevant.

14. The method of claim 13, wherein updating the pattern utility model is based on a comparison of the feedback ranking with the proposed ranking of candidate patterns.

15. An apparatus for data mining, comprising:
processing circuitry configured to execute one or more of a plurality of data mining processes based on control parameters to discover a plurality of result patterns in a data set, wherein the control parameters are computed based on a model of a single user's subjective user interest and based on a process selection probability distribution,
wherein prior to executing the data mining process, the data mining process is randomly selected from the plurality of data mining processes based on a process selection probability distribution function;
wherein the process selection probability distribution function for a data mining iteration 1 and data mining algorithm i is computed according to $$\pi_{l,i} = (\gamma_l - 1)v_i)/V + \gamma_l/k,$$

wherein V is a normalization factor, $v_i$ is a vector of performance potential weights for algorithm i, k denotes the total number of data mining algorithms, and $\gamma_l$ denotes a bandit mixture coefficient; and
an interface module configured to present the discovered result patterns to a user, and to receive information from one or more of the result patterns selected by the user according to the user's subjective interest;

wherein the processing circuitry is further configured to automatically update the control parameters based on the selection of result patterns, wherein a subsequent iteration uses the updated control parameters instead of the control parameters when computing the model of subjective user interest, such that a subsequent iteration comprises executing one or more of the plurality of data mining processes based on the updated control parameters to discover a plurality of updated result patterns.

16. A non-transitory computer readable medium operable to store and execute machine readable instructions to:
a) execute one or more of a plurality of data mining processes based on control parameters to discover a plurality of result patterns in a data set, wherein the control parameters are computed based on a model of a single user's subjective user interest and based on an process selection probability distribution,
wherein prior to executing the data mining process, the data mining process is randomly selected from the plurality of data mining processes based on a process selection probability distribution function,
wherein the process selection probability distribution function for a data mining iteration 1 and data mining algorithm i is computed according to $$\pi_{l,i} = (\gamma_l - 1)v_i)/V + \gamma_l/k,$$

wherein V is a normalization factor, $v_i$ is a vector of performance potential weights for algorithm i, k denotes the total number of data mining algorithms, and $\gamma_l$ denotes a bandit mixture coefficient
b) present the discovered result patterns to a user; receive information from one or more of the discovered result patterns selected by the user according to the user's subjective interest;
automatically update the control parameters based the selected result patterns; and
iterating the process, wherein an iteration comprises acts a) to c), and a subsequent iteration uses the updated control parameters instead of the control parameters in act a), such that a subsequent iteration comprises executing one or more of the plurality of data mining processes based on the updated control parameters to discover a plurality of updated result patterns.

* * * * *